July 27, 1926.

G. I. HARRISON

HINGE

Filed August 1, 1924

1,593,630

INVENTOR.
George I. Harrison
BY
ATTORNEYS.

Patented July 27, 1926.

1,593,630

UNITED STATES PATENT OFFICE.

GEORGE I. HARRISON, OF NEW YORK, N. Y.

HINGE.

Application filed August 1, 1924. Serial No. 729,466.

This invention relates to hinges, particularly to miniature hinges, such as are used in spectacle frame construction and the like.

One of the most troublesome parts of spectacles is the hinge which connects the temple of the lens frame or front. This is due to the fact that after the spectacles have been in use for a time, the screw or pin used to hold the parts of the hinge together becomes loosened and falls out, thus necessitating repairs. The loosening of the screw is frequently a result of the stripping or partial stripping of the threads as may be caused, for example, by a too severe tightening of the screw at the time of its insertion or by the back and forth motion of the screw brought about by the opening and closing of the temple.

The present invention contemplates a form of construction in which the total threaded area of the screw is so augmented that a stripping of the threads or an undesired loosening of the screw is practically eliminated.

It is further an object of the present invention to provide a member for locking the screw or pin of the hinge in position, so as to prevent positively any loosening of the said screw or pin and the consequent derangement of the hinge.

Various other objects and advantages will appears as the description of the invention proceeds.

Referring now to the drawing which illustrates a preferred embodiment of the invention, Figure 1 is a perspective view showing a hinge in position on a pair of spectacle frames;

Similar characters of reference designate similar parts in each of the several views.

Figure 1:
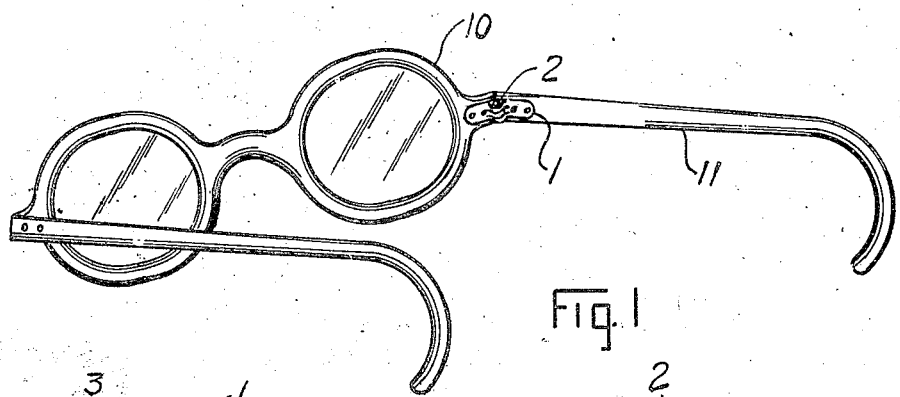

A hinge 1 is shown in its position on a pair of spectacle frames in Figure 1. One side of the hinge is fastened to a spectacle frame front 10 and the other to a temple piece 11.

Figure 2:
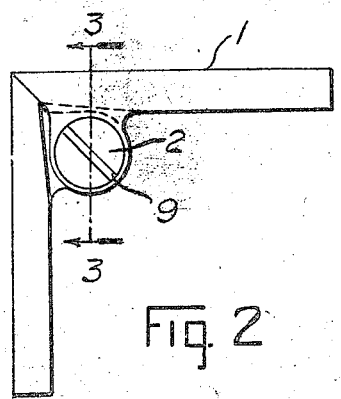
Figure 2 is an enlarged plan view of the hinge shown in Figure 1.
Figure 3:
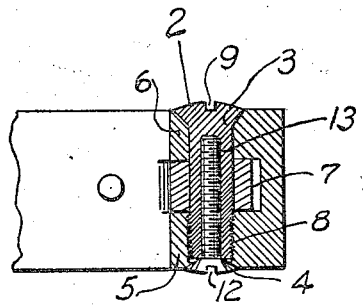
Figure 3 is a sectional view on the line 3—3 of Figure 2 looking in the direction of the arrows.

The construction of the hinge may be seen from Figures 2 and 3, in which a three barrel hinge is shown. An upper barrel 6 and a lower barrel 5 are integral with one side of the hinge, this being the side which is usually attached to the temple. A middle barrel 7 is integral with the other side of the hinge, which side is ordinarily affixed to the front. The lower barrel is provided with a threaded portion 8, to cooperate with a non-loosening hinge member 2 which holds the sides of the hinge together. Said non-loosening hinge member comprises a hollow shank 3 and a locking screw 4. The hollow shank has a smooth exterior surface except for its lower portion 8 which is threaded. The locking screw 4 is screwed into threads 13 within the hollow shank. The locking screw and the hollow shank are provided with screw-driver slots 12 and 9 respectively. When the hollow shank and the locking screw are tightened up and secured in their proper positions, it is impossible for the hinge to come apart. In the operation of the hinge, one side rotates back and forth as the spectacle frames are opened and closed, about the hinge member as an axis. As the exterior surface of the shank or hinge member is smooth, it is practically frictionless, so that there is no tendency to unscrew the shank. If, by any chance, binding should occur between the rotating barrel and the shank tending to unscrew the latter, the locking screw is raised and prevents further loosening of the shank. This action is accomplished by the head of the locking screw locking or binding against the face of the lower barrel, thereby preventing any further rotation of the shank.

Figure 4:
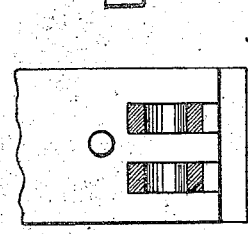
Figure 4 is an elevation of a five barrel hinge with a hinge member and a locking screw for same.
Figure 5:
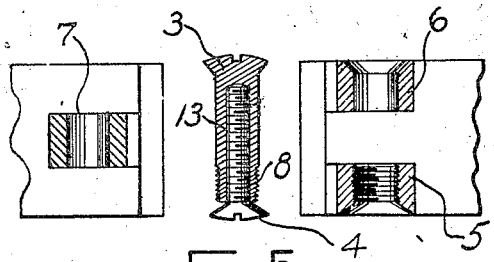
Figure 5 is an elevation of a three barrel hinge with a hinge member and a locking screw for same.

A five barrel hinge is shown in Figure 4 and a three barrel one in Figure 5. The lower barrels are threaded to receive the threaded lower end of the shank in both of the hinges shown. Of course, the upper barrels could be threaded and the shank inserted from the bottom. The hinge member and locking screw are applied to these hinges in the same manner as described above.

The split joint spectacle frame shown in

Figures 6, 7:
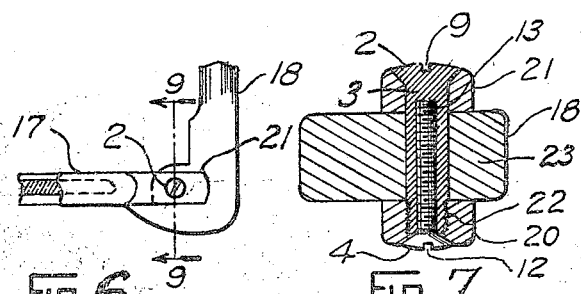
Figure 6 is a plan view of a split joint spectacle frame showing a modification of my invention applied thereto.
Figure 7 is a sectional view on the line 9—9 of Figure 6, looking in the direction of the arrows.

Figure 6 has the hinges formed integrally with the frame front and temples, thus eliminating auxiliary parts.

The eyewire 17 has the lower and upper barrels 20 and 21 incorporated in it. The temple 18 has the middle barrel 23 at its end. The non-loosening hinge 2 holds the barrels of the hinge together and prevents any loosening.

The hollow shank 3 is shown in Figure 7 engaging a thread 22 in the lower barrel 20, the outside of the shank being smooth except for the thread at its lower end. As before, the locking screw 4 engages the internal thread of the shank, so that loosening of the hinge is impossible. If by any chance the exterior surface of the shank is not smooth and binding occurs tending to unscrew the shank, the locking screw is raised and locks against the face of the lower barrel, thus preventing any further loosening.

It should be noted that in each of the different forms of construction the locking screw 4 provides ample thread area for permitting the hinge member to be securely locked in place without danger of injuring or stripping the threads. In certain instances the external threads 8 of the hollow shank 3 may be omitted entirely, sufficient thread area and holding power being provided by the locking member 4.

While I have shown and described several forms in which my invention may be embodied, it is understood that they may be modified in many respects without departing from the spirit of the invention as defined in the claims hereto appended.

What I claim is:—

1. A spectacle frame hinge, comprising, in combination, a plurality of relatively rotatable barrels, the bottom one of which is threaded, a smooth shank threaded at its lower end to engage in said threaded barrel, said shank being hollow and threaded internally, and a retaining screw engaged in said internal thread, said screw being arranged to be pressed against said threaded barrel by unscrewing of the shank.

2. The combination with two relatively rotatable barrels of a hinge member, comprising a smooth hollow shank threaded externally at its lower end into one of said barrels and threaded internally for substantially its full length, and a screw to engage said internal threads, for limiting unscrewing of the shank from the threaded barrel.

3. A spectacle frame hinge comprising a plurality of relatively rotatable barrels and a non-loosening hinge member, said member comprising a smooth hollow shank provided at one end with a head integral therewith and at the other end with a screw threaded into the shank, and held by the shank in position to engage with one of said barrels.

4. A hinge comprising at least three barrels one of the outer ones of which is threaded, a smooth hollow shank threaded externally to engage in said threaded barrel and also threaded internally, and a screw engaging in said internal threads and held thereby in position to engage the threaded barrel and prevent unscrewing of the shank therefrom.

5. In a spectacle frame the combination with two relatively rotatable hinge members of a pivot shank having right and left threaded portions, said shank passing through one of the hinge members, and threaded into the other of them by one of said threaded portions, and a retaining member connected to said shank by the other of said threaded portions in position to prevent unscrewing of the shank from the hinge member in which it is threaded.

In testimony whereof I have affixed my signature to this specification.

GEORGE I. HARRISON.